United States Patent

Thiaffey-Rencorel

[15] 3,657,711

[45] Apr. 18, 1972

[54] MULTIPLE HEAD UNIT FOR MAGNETIC DISC MEMORY

[72] Inventor: Gilbert A. Thiaffey-Rencorel, Saint-Michel Sur Orge, France

[73] Assignee: Societe D'Applications Generales D'Electricite et de Mecanique, Paris, France

[22] Filed: July 10, 1970

[21] Appl. No.: 53,809

[30] Foreign Application Priority Data

July 15, 1969 France ....................6924090

[52] U.S. Cl. ....................340/174.1 E, 179/100.2 P

[51] Int. Cl. ....................G11b 5/60

[58] Field of Search ....................179/100.2 P; 340/174.1 F

[56] References Cited

UNITED STATES PATENTS

| | | | |
|---|---|---|---|
| 3,310,792 | 3/1967 | Groom et al | 179/100.2 P |
| 3,177,495 | 4/1965 | Felts | 179/100.2 P |

*Primary Examiner*—Bernard Konick

*Assistant Examiner*—J. Russell Goudeau

*Attorney*—Abraham A. Saffitz

[57] ABSTRACT

Magnetic multiple head unit for a magnetic disc memory store. The head unit comprises a shoe on which are mounted two parallel staggered rows of mutually equi-spaced recording and reading heads and a blade spring mounting for said shoe enabling it to float close to the surface of the magnetic disc. The blade spring is rectangular, and is fixed along one side to a cross piece thereof and contains two windows defining a framework itself defining and end-notched crosspiece connected to the frame work on which the shoe is mounted.

1 Claim, 8 Drawing Figures

Patented April 18, 1972 3,657,711

3 Sheets-Sheet 1

INVENTOR:
GILBERT A. THIAFFEY-RENCOREL
By Graham C. Lafferty
ATTORNEY

INVENTOR:
Gilbert A. THIAFFEY-RENCOREL
By: Abraham A. Saffitz
ATTORNEY

INVENTOR:

Gilbert A. THIAFFEY-RENCOREL

By: Abraham A. Saffitz

ATTORNEY

MULTIPLE HEAD UNIT FOR MAGNETIC DISC MEMORY

The present invention relates to a multiple recording and reading head for memory stores of the magnetic disc type.

It is known that the magnetic heads associated with magnetic discs must not be in contact with the recording surface of the disc. In fact any direct contact of the head with the surface of the disc while it is rotating causes undesirable friction and as a matter of fact the magnetic heads are constructed to float on a cushion of air created at the surface of the disc and produced by the rapid rotation of the latter. In a known recording apparatus the head support shoes comprises several heads in line and it is mounted on the memory store support by means of a spring blade carrying bearings. The multiple head carries spindles engages in the said bearings and the shoe takes up a position of equilibrium determined by the strength of the spring and the reactions of the air cushion on the surface of the shoe. As a matter of fact the spindles are slightly decentered in relation to the head- carrying shoe and the latter floats in an oblique position in relation to the surface of the magnetic disc. As the line of the heads is radial with respect to the disc, all the heads are equidistant from the surface of the disc in spite of the obliqueness of the shoe and it is possible to keep this distance constant and equal to the requisite value of $2\mu$ approximately.

The main object of the invention is to provide a shoe with a double row of heads which permits the number of heads per shoe to be increased and consequently to decrease the total number of shoes associated with the disc.

The tracks of a magnetic disc have a small width, of the order of 0.25 mm. and a distance between the tracks of 0.15 mm.; thus a track occurs approximately every 0.4 mm. Assuming that the magnetic disc contains 256 tracks, 128 on the top and 128 on the bottom, it is possible to associate with each face either 16 shoes with 8 heads or 8 shoes with 16 heads. As each shoe includes a device for controlling its radial distance and a device for control of its flotation over the disc, there is a definite economic advantage in reducing the number of shoes.

The heads, taking into account the magnetic coils, have a lateral dimension such that their minimum spacing is equal to the width (between axes) of several tracks. If, for example, the minimum spacing of the heads is 3.2.mm. two adjacent heads can cooperate with two tracks whose numbers differ by $3.2/0.4 = 8$. The 16 heads of the first shoe can cooperate with the tracks Nos. 1,9 . . . . 121, the 16 heads of the second shoe with the tracks Nos. 2,10 . . . . 122 and the 16 heads of the eighth shoe with the tracks Nos. 8,17 . . . 128. Such an arrangement is possible but has the disadvantage of requiring long shoes which are difficult to manufacture and of interlacing all the tracks among themselves. The lines form a single aggregate and the interlacing relationship is one-eighth. It is therefore necessary to regulate the radial distances of all the shoes to obtain correct interlacing.

It is evidently advantageous to split up the assembly of tracks into sub-assemblies and to apply to the sub-assemblies a closer interlacing relationship.

To this end in accordance with one feature of the invention, each shoe comprises two sub-assemblies of magnetic heads aligned on two parallel rows the positions of the heads of the first sub-assembly being interlaced with the positions of the heads of the second sub-assembly along the common direction of alignment, that is to say along the length of the shoe. The result of this is that the distance in the direction of the length of the shoe (which is the radial direction of the disc) between two adjacent heads is now only equal to the total breadth of four tracks instead of 8. The first shoe cooperates with the tracks Nos. 1, 9 . . . 57 as far as the heads of its first alignment row are concerned and Nos. 5,13, . . . 61 as far as the heads of the second alignment row are concerned. Likewise the fourth shoe cooperates with the tracks Nos. 4, 12 . . . 60 as far as the heads of its first alignment row are concerned and Nos. 8, 16 . . . 64 as far as the heads of its second alignment row are concerned. There is always some interlacing of the tracks but the tracks are here divided into two sub-assemblies and the interlacing relationship is no more than one-fourth instead of one-eighth.

According to a further feature of the invention each shoe is mounted on its spring blade without the use of spindles, which permits all play to be suppressed and consequently improves the recording performance of the shoe.

As already mentioned, the shoes of the known recording device float in an oblique position with respect to the disc and their system of floating support is such that it maintains the alignment of the heads parallel to the disc. As in the invention there are two parallel head alignments per shoe, it is the plane itself of the shoe which has to be maintained parallel to the disc. This is achieved by mounting the shoe in a window of a spring blade unilaterally fixed on a side thereof parallel to the shoe in the frame of the memory store and by mounting the shoe on a crosspiece situated in the middle of the window. The bearing and spindle system is thus abolished which eliminates any play of the heads in the direction of the tracks and in the direction at right angles to the tracks.

Other characteristics and advantages of the invention will become apparent from reading the detailed description which will now be undertaken and from examination of the accompanying drawings in which.

Figure 1:
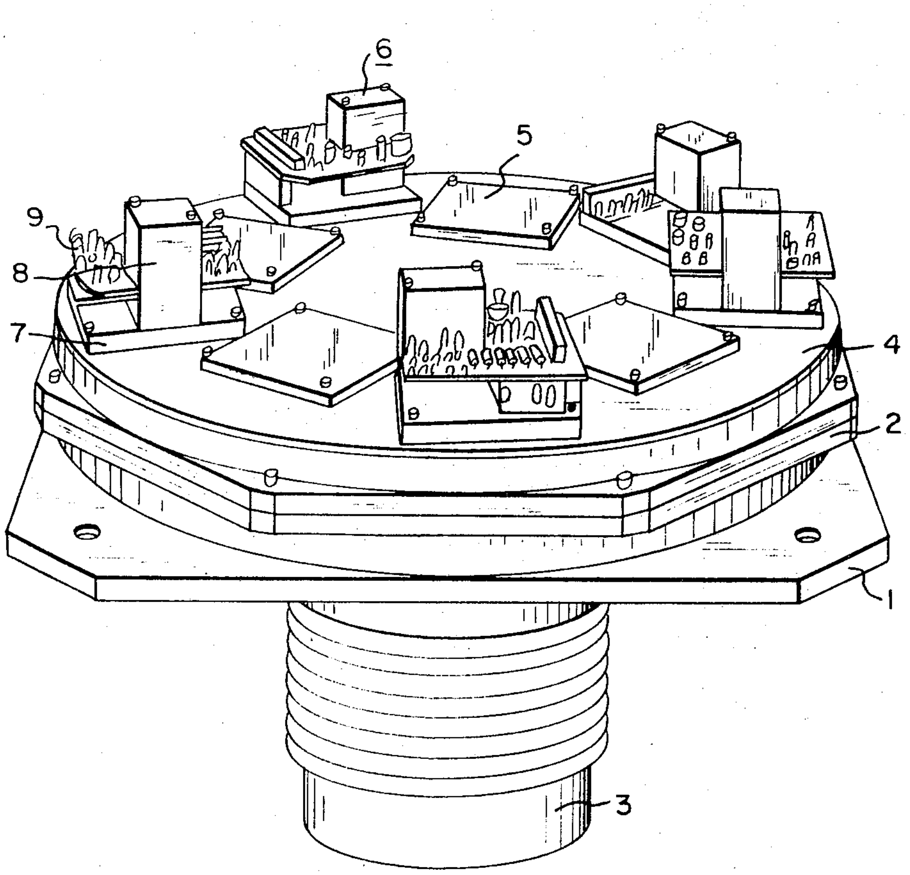
FIG. 1 shows a perspective view of a magnetic disc memory store equipped with shoe carrying devices.

Referring to FIG. 1, an air-tight case 2 containing a magnetic disc is mounted on a base plate 1 and a motor 3 driving the disc is mounted underneath the plate. The upper face 4 of the unit has a series of openings on the edges of which are positioned and screwed the bases of the shoe-carrying devices. In FIG. 1 there are nine apertures four of which are closed by a cover 5 and five of which are equipped with shoe carrying devices 6. There are five shoe carrying devices, four of which are for the recording and reading out of the information tracks of the disc and one for the reading of the clock and synchronization tracks which contain bit pulses, word pulses and turn pulses. Each shoe carrying device has a base 7 and a hood 8 and it is associated with a preamplifier 9 mounted on the base.

Figures 2, 3:
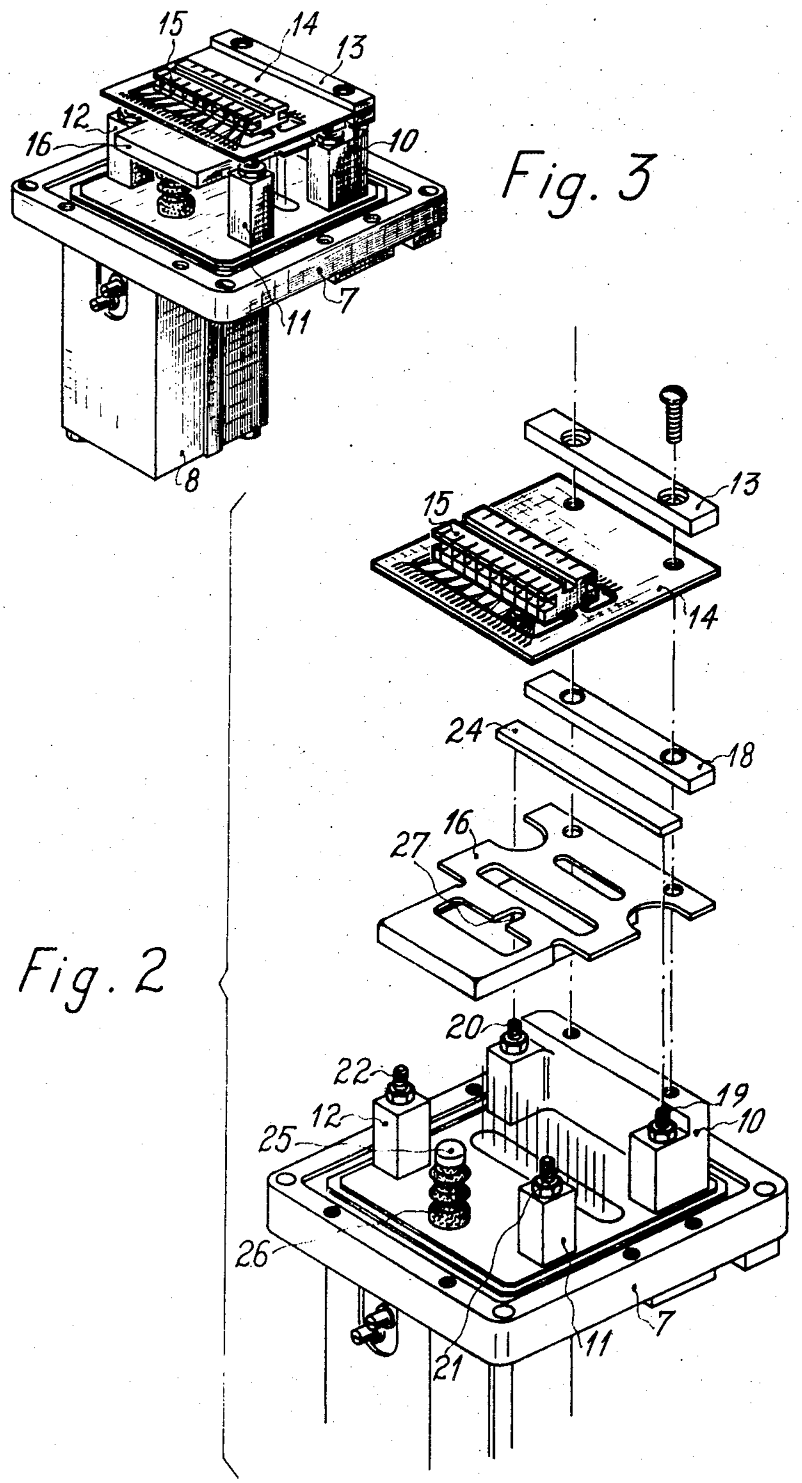
FIG. 2 shows a perspective view of a shoe carrying device.
FIG. 3 is an exploded view of the shoe carrying device.

Under the base 7 (FIGS. 2 and 3) of a shoe carrier are provided a bridge piece 10 and two pillars 11 and 12. Between the bridge piece 10 and a strip 13 are mounted on the one hand, the spring blade 14 which supports the shoe 15 and on the other hand a flexible blade 16 controlled by an electro-magnet (not visible in FIGS. 2 and 3 and situated in the hood 8) serving to lock the shoe in a position away from the disc when the latter is not turning. The blades 14 and 16 are kept apart by means of a spacing piece 18. The pillars 11 and 12 each have a threaded bore and these bores contain two screws 21 and 22 respectively, whose extremities rest on the two corners of the free edge of blade 14 parallel to the fixed edge. The bridge piece 10 also comprises two threaded bores forming a rectangle with the bores of the pillars 11 and 12. These bores contain two screws 19 and 20 respectively whose extremities abut against the lateral edges of the spring blade 14 perpendicular to the fixed edge in the vicinity of the housing. The screws 19–22 serve to regulate the position of the blade spring 14 and can be fixed after adjustment by screw nuts. The heads of the screws 19 and 20 carry a bridge piece 24 parallel to the strip 13 the position of which serves to regulate the bending moment at the housing of the spring blade 14.

Figure 4:
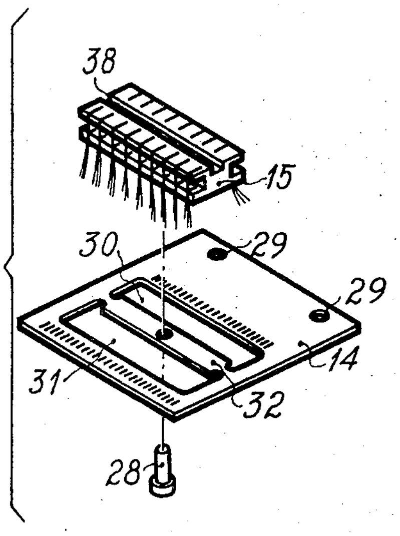
FIG. 4 shows a shoe and its blade spring in an exploded view.
Figure 8:
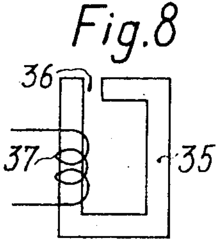
FIG. 8 shows the magnetic circuit of a track and its coil system.
Figure 5:
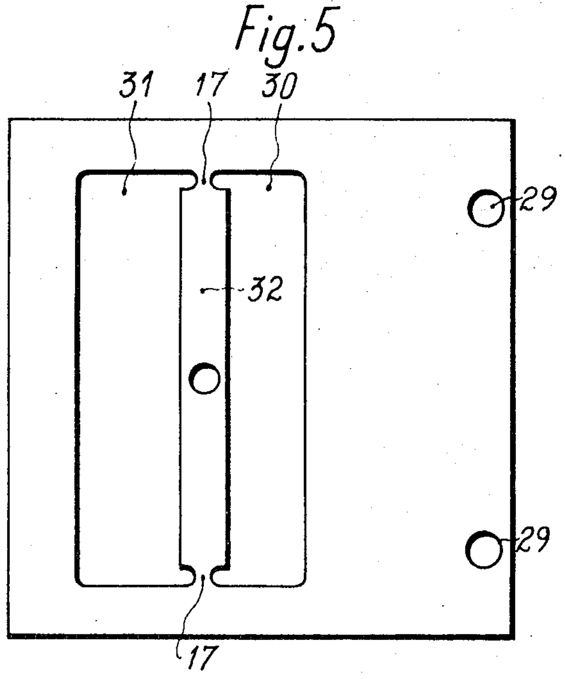
FIG. 5 is a plan view of the blade spring.

On the other side of the base 7 inside the hood 8 is mounted an electro-magnet with an adjustable core. To the adjustable core is attached a rod 25 which passes inside a tube 26 forming an air-tight bellows and the other extremity of which abuts against the flexible blade 16. The length of the rod is such that when the electro-magnet is excited, the blade 16 is substantially parallel to the base but is inclined towards the base when the electro-magnet is quiescent. The flexible blade 16 has a slit 27 through which passes a pin 28 with an enlarged head integral with the shoe and with the spring blade which carries it. It can be seen that when the flexible blade 16 is bent towards the base it entrains the pin 28 (FIGS. 4 and 5) by means of its enlarged head engaging with the slit 27 and that the shoe is thus in a raised position.

The spring blade 14 is of substantially square shape. It is pierced by two holes 29 serving for the passage of screws which fasten the strip 13 and the spacing piece 18 to the pillar 10. It is also, pierced by two rectangular windows 30 and 31 defining between them a crosspiece 32. Said crosspiece is narrowed at its extremities at 17 in order to be able to twist the plane thereof easily so as to adjust the position of the shoe. The shoe 15 is connected to the crosspiece 32 on one side of the spring blade 14 and on the other side there is the lifting rod 28 which passes through the crosspiece 32 and is screwed into the shoe 15.

Figure 6:
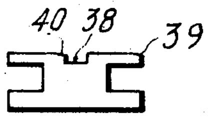
FIG. 6 is an end view of the shoe.
Figure 7:
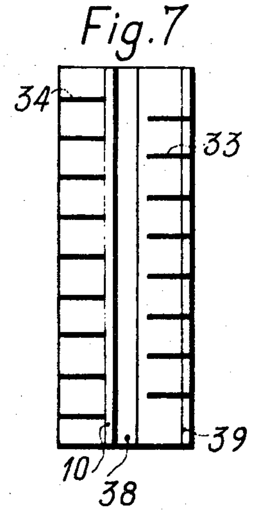
FIG. 7 is a plan view of the shoe.

The shoe 15 is a piece of insulating material having an H-shaped profile (FIG. 6) with a relatively deep central web and short wings. The wings and the web are notched with slits 33 on one side of the web and 34 on the other side. The slits 33 and 34, are equi-spaced with the same spacing in both cases and the longitudinal extensions thereof are symmetrically interdigitated. Magnetic heads 35 are inserted in the slits 33 and 34 each being in the form of a flat rectangular framework having an air gap 36 in the split portion flush with the surface of the shoe. The coils 37 of the heads are mounted on the limb of the framework located between the wings of the shoe.

The active surface of the shoe 15 floating over the disc is suitably profiled (for instance by bevelling) so as to be raised by the layer of air entrained by the disc. This surface has a central longitudinal groove 38 and the leading edge 39 of a wing and one of the edges 40 of the groove 38 are slightly bevelled to facilitate the entry of the layer of air between the disc and the active surface of the shoe.

The above described head-carrying shoe and the head-carrying device enable the number of heads cooperating with a given area of the magnetic memory disc to be increased which is a source of economy and eliminates all floating and all play of the heads in the direction of the track and laterally thereto, which improves the performance and the capacity of this type of memory.

It has been assumed up to now that the shoes had 16 heads, eight on each alignment row. In a variant one of the alignment rows has eight heads and the other nine heads. The first series of heads of the first shoe cooperate with the tracks 1, 10, . . . 73 and the second series of heads of this same shoe with the tracks 5, 14, . . . 68. The first series of heads of the fourth shoe cooperates with the tracks 4, 13, . . . 76 and the second series of heads of this same shoe with the tracks 8, 17, . . . 71. All the tracks from 1 to 76 cooperate with the heads with the exception of the tracks 9, 18, 27, 36, 45, 54, 63, 72. These tracks are provided for clock and synchronizing purposes and a supplementary multiple eight-head shoe sweeps these tracks. The nine heads of the second alignment row of this supplementary multiple head thus sweep the tracks 4, 13, 22, 31, 40,49, 58, 67, 76 which are thus swept twice by the fourth and ninth shoes. For a given track of this group the head of one of these two shoes functions as a recording head and the head of the other shoe functions as a reading head. The data from the tracks swept by two heads can thus be easily fed to a read-out console.

In this modification of the invention the longitudinal extension of the heads of one row is now symmetrically interdigitated with the heads of the other row the spacing between two adjacent heads being divided in the ratio of 4/5.

What I claim is:

1. A multiple magnetic head unit for a rotating magnetic disc memory comprising:
   - a shoe containing two parallel staggered and mutually symmetrically interdigitated rows of mutually equi-spaced magnetic heads, said shoe having slots therein in which the heads are supported, the surface of said shoe facing the magnetic disc being divided into two parts by a groove between the two rows of heads, the leading edge of each part of said surface being bevelled so as to cause the shoe to be lifted by the cushion of air created by the rotation of said magnetic disc;
   - a blade spring mounting for said shoe enabling it to float close to the surface of the magnetic disc, said blade spring being rectangular and containing two windows defining a framework and an end-notched cross piece on which the shoe is mounted, said blade spring being secured on one side thereof parallel to said crosspiece;
   - two regulating screws and a spacer strip abutting against said blade spring in the vicinity of the secured side and parallel thereto;
   - and means for raising and locking said blade spring in a position in which the individual heads are out of cooperative proximity to said magnetic disc.

* * * * *